US012677170B2

(12) United States Patent
Zhu et al.

(10) Patent No.: US 12,677,170 B2
(45) Date of Patent: Jul. 7, 2026

(54) USER EQUIPMENT DOWNLINK TRANSMISSION BEAM PREDICTION FRAMEWORK WITH MACHINE LEARNING

(71) Applicant: NOKIA TECHNOLOGIES OY, Espoo (FI)

(72) Inventors: Qiping Zhu, Wheaton, IL (US); Frederick Vook, Schaumburg, IL (US)

(73) Assignee: NOKIA TECHNOLOGIES OY, Espoo (FI)

( * ) Notice: Subject to any disclaimer, the term of this patent is extended or adjusted under 35 U.S.C. 154(b) by 497 days.

(21) Appl. No.: 17/886,425

(22) Filed: Aug. 11, 2022

(65) Prior Publication Data

US 2024/0056844 A1 Feb. 15, 2024

(51) Int. Cl.
| | |
|---|---|
| *H04L 5/00* | (2006.01) |
| *H04W 16/28* | (2009.01) |
| *H04W 24/08* | (2009.01) |

(52) U.S. Cl.
CPC ........... *H04W 24/08* (2013.01); *H04L 5/0048* (2013.01); *H04W 16/28* (2013.01)

(58) Field of Classification Search
CPC .. H04B 7/063; H04B 7/0639; H04B 7/06952; H04L 5/0048; H04W 16/28; H04W 24/08
See application file for complete search history.

(56) References Cited

U.S. PATENT DOCUMENTS

| | | | | | |
|---|---|---|---|---|---|
| 5,151,705 | A | * | 9/1992 | Badger | ................... H01Q 3/22 342/368 |
| 2021/0336683 | A1 | | 10/2021 | Pezeshki et al. | |

OTHER PUBLICATIONS

Nokia ("Other aspects on ML for beam management"; R1-2204574; e-Meeting, May 9-20, 2022) (Year: 2022).*
Extended European Search Report dated Jan. 8, 2024 corresponding to European Patent Application No. 23189105.2.
Nokia et al., "Evaluation on ML for beam management," 3GPP Draft; R1-2204573, 3GPP TSG RAN WG1 #109, e- Meeting, May 9-May 20, 2022, Apr. 29, 2022, XP052153595.

(Continued)

*Primary Examiner* — Asad M Nawaz
*Assistant Examiner* — Natali Pascual Peguero
(74) *Attorney, Agent, or Firm* — Robert P. Michal, Esq.; Rimon PC

(57) ABSTRACT

Systems, methods, apparatuses, and computer program products for a user equipment downlink transmission beam prediction framework with machine learning are provided. For example, a method can include indicating a beam prediction capability of a user equipment to a network. The method can also include receiving network antenna configuration identification responsive to the indicated beam prediction capability. The method can further include selecting a model for beam prediction based on the network antenna configuration identification. The method can additionally include receiving a configuration of reference signal resources. The method can also include measuring reference signals based on the configuration of reference signal resources. The method can further include performing beam prediction based on the measured references signals using the selected model. The method can additionally include reporting a beam prediction to the network.

20 Claims, 14 Drawing Sheets

(56)  References Cited

OTHER PUBLICATIONS

Nokia et al., "Other aspects on ML for beam management," 3GPP Draft; R1-2204574, 3GPP TSG RAN WG1 #109, e-Meeting, May 9-May 20, 2022, Apr. 29, 2022, XP052153596.

3GPP TR 38.802 V14.2.0 (Sep. 2017), Technical Report, 3rd Generation Partnership Project; Technical Specification Group Radio Access Network; Study on New Radio Access Technology Physical Layer Aspects (Release 14), Sep. 2017.

3GPP TS 38.213 V17.2.0 (Jun. 2022), Technical Specification, 3rd Generation Partnership Project; Technical Specification Group Radio Access Network; NR; Physical layer procedures for control (Release 17), Jun. 2022.

3GPP TS 38.214 V17.2.0 (Jun. 2022), Technical Specification, 3rd Generation Partnership Project; Technical Specification Group Radio Access Network; NR; Physical layer procedures for data (Release 17), Jun. 2022.

3GPP TS 38.321 V17.1.0 (Jun. 2022), Technical Specification, 3rd Generation Partnership Project; Technical Specification Group Radio Access Network; NR; Medium Access Control (MAC) protocol specification (Release 17), Jun. 2022.

Qualcomm (Moderator), "New SI: Study on Artificial Intelligence (AI)/Machine Learning (ML) for NR Air Interface," RP-213599, 3GPP TSG RAN Meeting #94e, Electronic Meeting, Dec. 6-17, 2021.

Moderator (OPPO), "Discussion summary#4 for other aspects on AI/ML for beam management," R1-2205454, 3GPP TSG RAN WG1 #109-e, e-Meeting, May 9-20, 2022.

3GPP TS 38.331 V17.1.0 (Jun. 2022), Technical Specification, 3rd Generation Partnership Project; Technical Specification Group Radio Access Network; NR; Radio Resource Control (RRC) protocol specification (Release 17), Jun. 2022.

Communication under Rule 71(3) EPC dated Jul. 2, 2025 corresponding to European Patent Application No. 23189105.2.

* cited by examiner

Third Set Input                 Third Set Output

| Layer index | (input size ,output size) | NN Layer |
|---|---|---|
| 1 | - | LayerNormalization |
| 2 | (|Set C|, |Set C|) | LayerNormalization (LeakyReLU (Dense_1)) |
| 3 | (|Set C|, |Set C|) | LayerNormalization (LeakyReLU (Dense_2)) |
| 4 | (|Set C|, |Set C|*K) | LayerNormalization (LeakyReLU (Dense_3)) |
| 5 | (|Set C|*K, |Set C|*K) | LayerNormalization (LeakyReLU (Dense_4)) |
| 6 | - | Dropout |
| 7 | (|Set C|*K, |Set C|) | LayerNormalization (LeakyReLU (Dense_5)) |
| 8 | (|Set C|, |Set C|) | LayerNormalization (LeakyReLU (Dense_6)) |
| 9 | - | LayerNormalization (Addition $y_3 + y_8$) |
| 10 | (|Set C|, |Set C|) | Softmax(OutPut_Dense_6) |

FIG. 7A

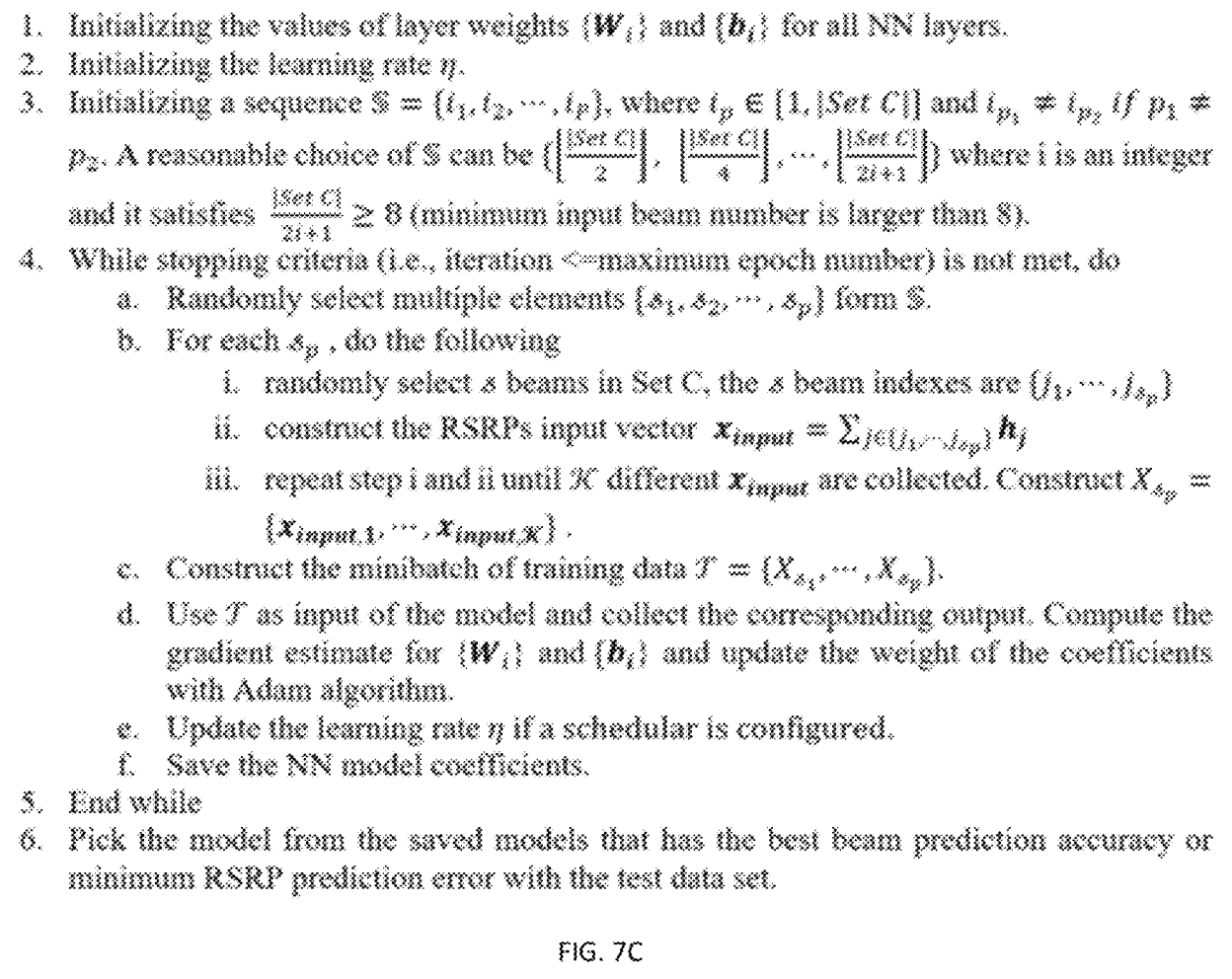

1. Initializing the values of layer weights $\{W_i\}$ and $\{b_i\}$ for all NN layers.
2. Initializing the learning rate $\eta$.
3. Initializing a sequence $S = (i_1, i_2, \cdots, i_p)$, where $i_p \in \{1, |Set\ C|\}$ and $i_{p_1} \neq i_{p_2}$ if $p_1 \neq p_2$. # $p_2$: A reasonable choice of $S$ can be ($\lfloor \frac{|Set\ C|}{2} \rfloor$, $\lfloor \frac{|Set\ C|}{4} \rfloor$, $\cdots$, $\lfloor \frac{|Set\ C|}{2i+1} \rfloor$) where i is an integer and it satisfies $\frac{|Set\ C|}{2i+1} \geq 8$ (minimum input beam number is larger than 8).
4. While stopping criteria (i.e., iteration <=maximum epoch number) is not met, do
   a. Randomly select multiple elements $(s_1, s_2, \cdots, s_p)$ form $S$.
   b. For each $s_p$, do the following
      i. randomly select s beams in Set C, the s beam indexes are $(j_1, \cdots, j_s)$
      ii. construct the RSRPs input vector $x_{input} = \sum_{j \in \{j_1, \cdots, j_s\}} h_j$
      iii. repeat step i and ii until $K$ different $x_{input}$ are collected. Construct $X_{s_p} =$ $(x_{input\,1}, \cdots, x_{input\,K})$.
   c. Construct the minibatch of training data $T = (X_{s_1}, \cdots, X_{s_p})$.
   d. Use $T$ as input of the model and collect the corresponding output. Compute the gradient estimate for $\{W_i\}$ and $\{b_i\}$ and update the weight of the coefficients with Adam algorithm.
   e. Update the learning rate $\eta$ if a schedular is configured.
   f. Save the NN model coefficients.
5. End while
6. Pick the model from the saved models that has the best beam prediction accuracy or minimum RSRP prediction error with the test data set.

FIG. 7C

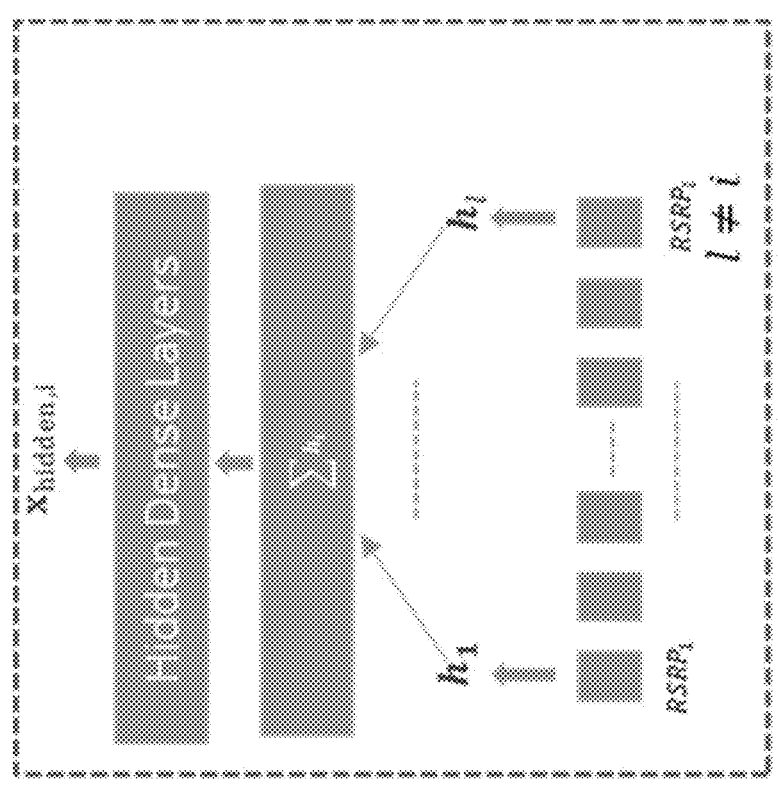
FIG. 10A
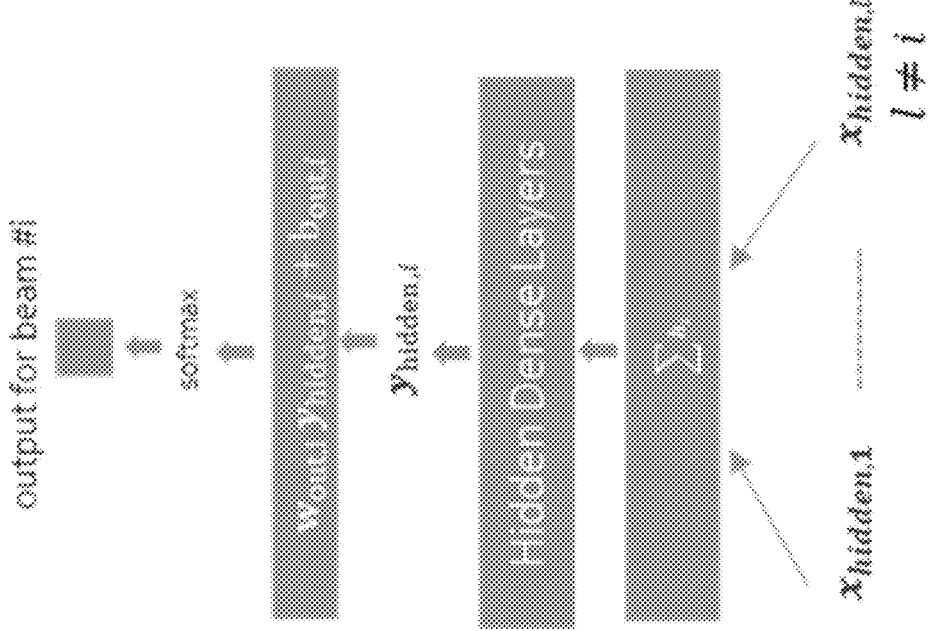

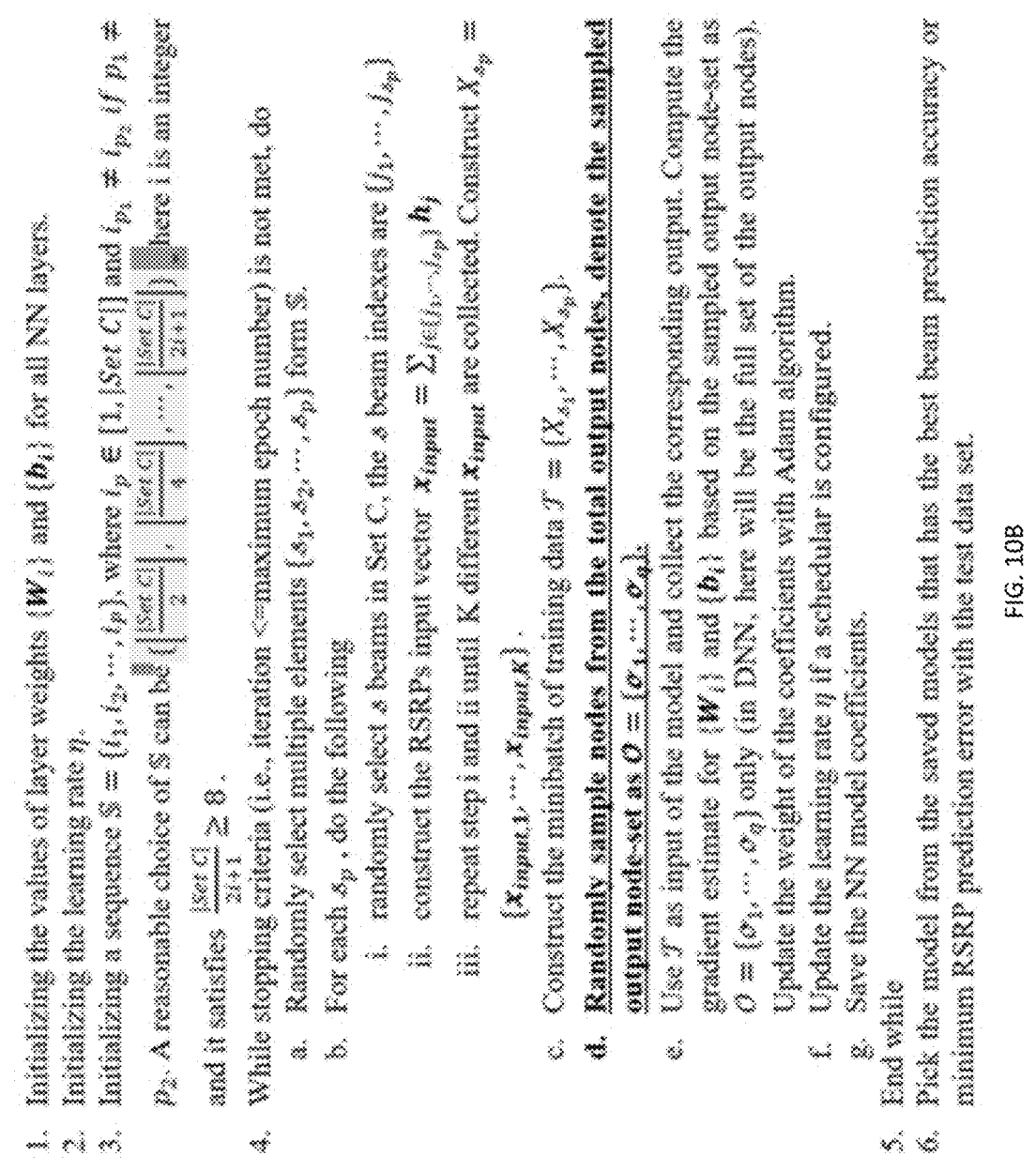

1. Initializing the values of layer weights $\{W_i\}$ and $\{b_i\}$ for all NN layers.

2. Initializing the learning rate $\eta$.

3. Initializing a sequence $S = (t_1, t_2, \cdots, t_p)$, where $t_p \in [1, |\text{Set } C|]$ and $t_{p_1} \neq t_{p_2}$ if $p_1 \neq$ $p_2$. A reasonable choice of $S$ can be $\left(\left\lceil\frac{|\text{Set } C|}{2}\right\rceil, \left\lceil\frac{|\text{Set } C|}{2}\right\rceil + j, \cdots, \left\lceil\frac{|\text{Set } C|}{2}\right\rceil\right)$ where $i$ is an integer and it satisfies $\frac{|\text{Set } C|}{2i+1} \geq 0$.

4. While stopping criteria (i.e., iteration < maximum epoch number) is not met, do a. Randomly select multiple elements $(s_1, s_2, \cdots, s_p)$ form $S$.

b. For each $s_j$, do the following i. randomly select $s$ beams in Set C, the $s$ beam indexes are $(j_1, \cdots, j_{s_j})$ ii. construct the RSRP's input vector $x_{input} = \sum_{j \in (j_1, \cdots, j_{s_j})} h_j$ iii. repeat step i and ii until K different $x_{input}$ are collected. Construct $X_{s_j} = (x_{input,1}, \cdots, x_{input,K})$.

c. Construct the minibatch of training data $\mathcal{T} = (X_{s_1}, \cdots, X_{s_p})$.

d. Randomly sample nodes from the total output nodes, denote the sampled output node-set as $O = \{o_1, \cdots, o_q\}$.

e. Use $\mathcal{T}$ as input of the model and collect the corresponding output. Compute the gradient estimate for $\{W_i\}$ and $\{b_i\}$ based on the sampled output node-set as $O = \{o_1, \cdots, o_q\}$ only (in DNN, here will be the full set of the output nodes).

f. Update the weight of the coefficients with Adam algorithm.

g. Update the learning rate $\eta$ if a scheduler is configured.

g. Save the NN model coefficients.

5. End while

6. Pick the model from the saved models that has the best beam prediction accuracy or minimum RSRP prediction error with the test data set.

FIG. 10B

USER EQUIPMENT DOWNLINK TRANSMISSION BEAM PREDICTION FRAMEWORK WITH MACHINE LEARNING

FIELD

Some example embodiments may generally relate to communications including mobile or wireless telecommunication systems, such as Long Term Evolution (LTE) or fifth generation (5G) radio access technology or new radio (NR) access technology, or other communications systems including subsequent generations of the same or similar standards. For example, certain example embodiments may generally relate to a user equipment downlink transmission beam prediction framework with machine learning.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G wireless systems refer to the next generation (NG) of radio systems and network architecture. A 5G system is mostly built on 5G new radio (NR), but a 5G (or NG) network can also build on the E-UTRA radio. From release 18 (Rel-18) onward, 5G is referred to as 5G advanced. It is estimated that NR provides bitrates on the order of 10-20 Gbit/s or higher, and can support at least service categories such as enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. The next generation radio access network (NG-RAN) represents the RAN for 5G, which can provide both NR and LTE (and LTE-Advanced) radio accesses. It is noted that, in 5G, the nodes that can provide radio access functionality to a user equipment (i.e., similar to the Node B, NB, in UTRAN or the evolved NB, eNB, in LTE) may be named next-generation NB (gNB) when built on NR radio and may be named next-generation eNB (NG-eNB) when built on E-UTRA radio. 6G is currently under development and may replace 5G and 5G advanced.

SUMMARY

An embodiment may be directed to an apparatus. The apparatus can include at least one processor and at least memory including computer program. The at least one memory and the computer program can be configured to, with the at least one processor, cause the apparatus at least to indicate a beam prediction capability of a user equipment to a network. The at least one memory and the computer program can also be configured to, with the at least one processor, cause the apparatus at least to receive network antenna configuration identification responsive to the indicated beam prediction capability. The at least one memory and the computer program can further be configured to, with the at least one processor, cause the apparatus at least to select a model for beam prediction based on the network antenna configuration identification. The at least one memory and the computer program can additionally be configured to, with the at least one processor, cause the apparatus at least to receive a configuration of reference signal resources. The at least one memory and the computer program can also be configured to, with the at least one processor, cause the apparatus at least to measure reference signals based on the configuration of reference signal resources. The at least one memory and the computer program can further be configured to, with the at least one processor, cause the apparatus at least to perform beam prediction based on the measured references signals using the selected model. The at least one memory and the computer program can additionally be configured to, with the at least one processor, cause the apparatus at least to report a beam prediction to the network.

An embodiment may be directed to an apparatus. The apparatus can include at least one processor and at least memory including computer program. The at least one memory and the computer program can be configured to, with the at least one processor, cause the apparatus at least to receive an indication of a beam prediction capability of a user equipment. The at least one memory and the computer program can be configured to, with the at least one processor, cause the apparatus at least to provide, to the user equipment, a network antenna configuration identification responsive to the indicated beam prediction capability. The at least one memory and the computer program can be configured to, with the at least one processor, cause the apparatus at least to provide, to the user equipment, a configuration of reference signal resources. The at least one memory and the computer program can be configured to, with the at least one processor, cause the apparatus at least to receive a beam prediction from the user equipment based on the network antenna configuration identification and configuration of reference signal resources.

An embodiment may be directed to a method. The method can include indicating a beam prediction capability of a user equipment to a network. The method can also include receiving network antenna configuration identification responsive to the indicated beam prediction capability. The method can further include selecting a model for beam prediction based on the network antenna configuration identification. The method can additionally include receiving a configuration of reference signal resources. The method can also include measuring reference signals based on the configuration of reference signal resources. The method can further include performing beam prediction based on the measured references signals using the selected model. The method can additionally include reporting a beam prediction to the network.

An embodiment may be directed to a method. The method can include receiving an indication of a beam prediction capability of a user equipment. The method can also include providing, to the user equipment, a network antenna configuration identification responsive to the indicated beam prediction capability. The method can further include providing, to the user equipment, a configuration of reference signal resources. The method can additionally include receiving a beam prediction from the user equipment based on the network antenna configuration identification and configuration of reference signal resources.

An embodiment can be directed to an apparatus. The apparatus can include means for indicating a beam prediction capability of a user equipment to a network. The apparatus can also include means for receiving network antenna configuration identification responsive to the indicated beam prediction capability. The apparatus can further include means for selecting a model for beam prediction based on the network antenna configuration identification. The apparatus can additionally include means for receiving a configuration of reference signal resources. The apparatus can also include means for measuring reference signals based on the configuration of reference signal resources. The apparatus can further include means for performing beam prediction based on the measured references signals using the selected model. The apparatus can additionally include means for reporting a beam prediction to the network.

An embodiment can be directed to an apparatus. The apparatus can include means for receiving an indication of a beam prediction capability of a user equipment. The apparatus also includes means for providing, to the user equipment, a network antenna configuration identification responsive to the indicated beam prediction capability. The apparatus further includes means for providing, to the user equipment, a configuration of reference signal resources. The apparatus additionally includes means for receiving a beam prediction from the user equipment based on the network antenna configuration identification and configuration of reference signal resources

BRIEF DESCRIPTION OF THE DRAWINGS

For proper understanding of example embodiments, reference should be made to the accompanying drawings, wherein:

FIG. 7A illustrates a neural network model layout for user equipment downlink transmission beam prediction, according to certain embodiments, in a tabular form;

FIG. 7C illustrates a pseudocode example of a training algorithm for a neural network according to certain embodiments.

FIG. 10A illustrates a computational graph for a given node or beam with second-order neighborhood embedding, according to certain embodiments;

FIG. 10B illustrates a pseudocode example of a training algorithm for a graph neural network according to certain embodiments.

DETAILED DESCRIPTION

Figure 1:
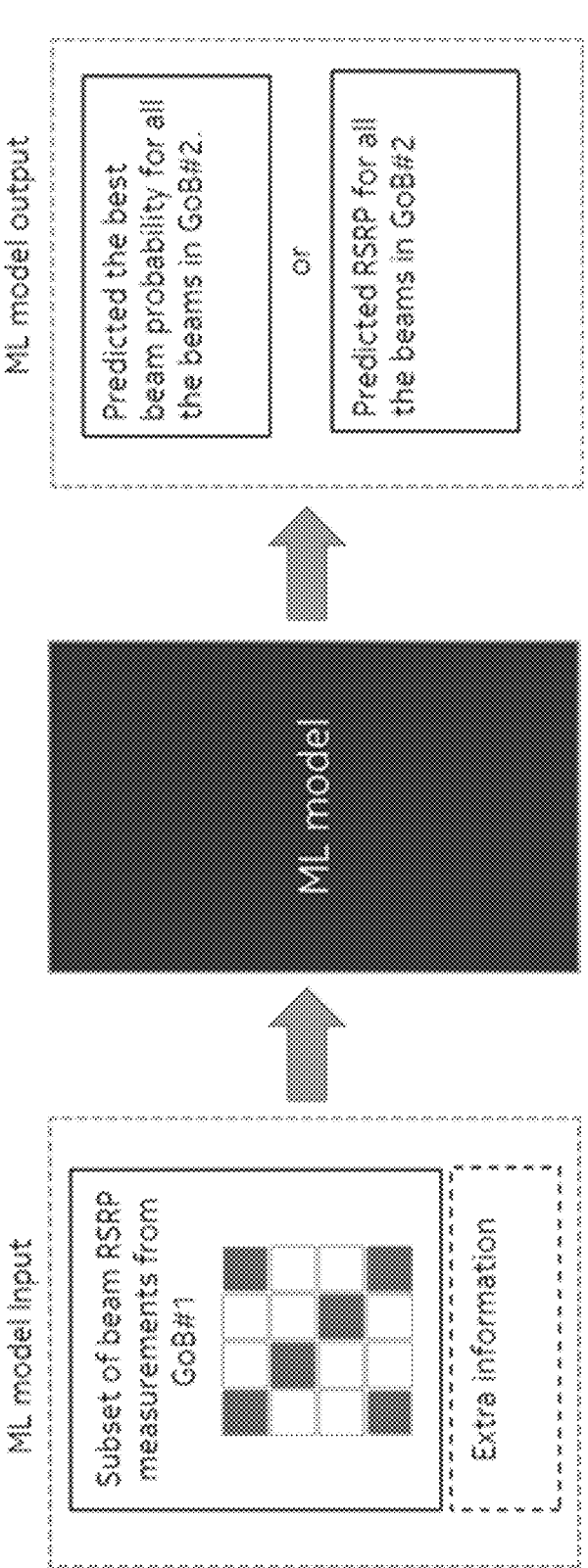
FIG. 1 illustrates an artificial intelligence/machine learning use case of beam prediction on the special domain.

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for providing a user equipment downlink transmission beam prediction framework with machine learning, is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

As used herein, "at least one of the following: <a list of two or more elements>" and "at least one of <a list of two or more elements>" and similar wording, where the list of two or more elements are joined by "and" or "or," mean at least any one of the elements, or at least any two or more of the elements, or at least all the elements.

Certain embodiments may have various aspects and features. These aspects and features may be applied alone or in any desired combination with one another. Other features, procedures, and elements may also be applied in combination with some or all of the aspects and features disclosed herein.

Additionally, if desired, the different functions or procedures discussed below may be performed in a different order and/or concurrently with each other. Furthermore, if desired, one or more of the described functions or procedures may be optional or may be combined. As such, the following description should be considered as illustrative of the principles and teachings of certain example embodiments, and not in limitation thereof.

Beam management standardization efforts by the third generation partnership project (3GPP) in release 15 (Rel-15) standardized a set of operations for supporting beamforming transmission, including beam sweeping, beam measurements and reporting, beam maintenance and recovery. All these aspects may be found detailed in the standard under the broad topic of beam management procedures. Beam management evolved in release 16 (Rel-16) and successively in release 17 (Rel-17) to support more advanced configurations, such as multi-beam reporting to enable multi transmission reception points (TRPs) and multi-panel configurations.

With a larger number of beams supported by high-dimensional multiple-input, multiple-output (MIMO) arrays, the channel state information reference signal (CSI-RS) measurements and feedback overhead can radically increase to enable beam selection. In addition, the time required for the network (NW) and the user equipment (UE) to complete the beam sweeping and establish the best beam can increase accordingly. Thus, support of low latency communication may be limited.

The time involved may be mainly due to the frequency of synchronization signal block (SSB)/CSI-RS transmission during procedures, identified as P1, P2, and P3 for reference only, and which are described in 3GPP technical report (TR 38.802).

In P1, beam sweeping may be implemented for the NW to scan the coverage area periodically transmitting SSBs with wide angular beams. Conversely, the UE can scan different SSBs to identify the best beam and corresponding time/frequency resources on which to request access.

In P2, the NW can perform beam refinement by transmitting CSI-RSs with narrow beams to identify a more precise direction towards the UE, after establishing the wide beam in P1.

In P3, beam refinement can be implemented at the UE side to scan a set of Rx narrow beams while the NW transmits CSI-RS s using the best beam identified in P2.

Procedures P1, P2, and P3 can be executed sequentially to establish the data transmission between NW and UE. In case of beam failure and recovery the procedures may be fully repeated. In addition, P2 and P3 may also be periodically repeated for beam maintenance.

Support of artificial intelligence (AI)/machine learning (ML)-based beam management may be due to overhead savings and latency reduction. ML algorithms may enable predicting the serving beam for different UE locations and time instances, thus avoiding measuring the actual beam quality and saving those resources to be employed for data transmission. On the other hand, beam scanning operations like those performed in P1, P2 and P3 may be time inefficient and unscalable when the size of antenna arrays increases. Therefore, ML algorithms can replace sequential beam scanning by recommending a reduced set of beams likely to contain the best beam index of the full scan.

The use cases for AI/ML-based beam management may include beam prediction in time and/or spatial domain and beam selection accuracy improvement. Beam prediction in time can refer to the broad range of ML approaches that predict the next beam to use. Differently, spatial domain ML approaches can infer the best beam in different spatial locations. Improving beam selection accuracy can benefit reliability and outage avoidance, as well as more specific applications.

FIG. 1 illustrates an artificial intelligence/machine learning use case of beam prediction on the special domain. As shown in FIG. 1, a ML model input can be provided as an input to an ML model. The ML model can provide an ML model output. The ML model input can include a subset of beam RSRP measurements from grid of beams GoB #1 (or Set A), and optionally extra information. The ML model output can include a predicted the best beam probability for all the beams in GoB #2 (or Set B) or a predicted RSRP for all the beams in GoB #2.

In the example scenario of FIG. 1, the RSRP measurements of a subset of the downlink (DL) transmission (Tx) beam in NW GoB #1 may be used to predict the best DL Tx beam for NW GoB #2 at the UE side. This approach may avoid measuring all DL Tx beams for GoB #2. The GoB #2 can be the same as GoB #1 in one use case. For example, a single TRP can measure and predict from the same beam codebook. GoB #2 can be different from GoB #1 in another use case. For example, GoB #1 and GoB #2 can be from a single TRP and can have different number of beams with different beamwidths. For example, GoB #1 and GoB #2 can have different angular granularities for discrete Fourier transform (DFT) beam grids. GoB #1 can have a wide beam codebook (for example, GoB #1 may have beams with wider beamwidths) but GoB #2 can have a narrow beam codebook (for example, GoB #2 may have beams with narrower beamwidths), or GoB #1 and GoB #2 can be from different TRPs. GoB #2 can be referred to as Set A and GoB #1 can be referred to as Set B.

For AI/ML-based beam management, it may be beneficial to support the following cases for characterization and baseline performance evaluations. In one case, spatial-domain DL beam prediction may be performed for a set of beams, for example, GoB #2 based on measurement results of another set of beams, such as GoB #1. In another case, temporal DL beam prediction may be performed for one set of beams, for example, GoB #2, based on the historic measurement results of another set of beams, such as GoB #1. Beams in GoB #1 and GoB #2 can be in the same frequency range, such as frequency range 1 (FR1) or frequency range 2 (FR2).

The DL TX-RX beam pair prediction operation can be performed with either of the following: the NW knows some information about the DL RX beams, or the UE knows some info about the DL TX beams. It may be reasonable to implement a beam pair prediction model at the UE side. To perform UE side DL TX-RX beam pair prediction, in a first step the UE can have a model for DL TX beam prediction. This model can then, in a second step, be extended from being a UE side DL TX beam prediction model to performing UE side DL TX-RX beam prediction. Certain embodiments may relate to providing a model for DL TX beam prediction, which may be suitable for extension to being a UE side DL TX beam prediction model to performing UE side DL TX-RX beam prediction.

One option for providing a model for DL TX beam prediction is for the NW to transfer a trained model to the UE for DL TX beam prediction. In this case, the transferred model will be a black-box to UE, which may make it difficult to extend the transferred model with further RX beam prediction capability.

Accordingly, certain embodiments provide a model for DL TX beam prediction that can be trained at the UE side. In this way, the UE may have full control of the model. Such a model can be extended/combined with UE RX beam prediction. To enable UE side DL TX beam prediction without model transferring, the trained model(s) may have the following characteristics.

The trained model can perform accurate DL TX beam prediction for any NW antenna configuration $(M,N,d_{az},d_{ele})$. M, N can be the numbers of row and column of antenna elements in a 2D planar antenna, and $d_{az}$, $d_{ele}$, can be the antenna element distance in azimuth and elevation domain respectively.

The trained model can perform accurate DL TX beam prediction for any number of beams in a first set (set A), and each beam in the first set can point to any direction within the serving area. The construction of the first set can be varied from different NW vendors. The first set, which can also be known as set A, can be a target output target beam of a machine learning model.

The trained model also perform accurate DL TX beam prediction with any number of beams in a second set (Set B), and each beam in the second set can point to any direction within the serving area. The construction of the second set can be varied from different NW vendors. The second set, which can also be known as set B, can be an input beam set of a machine learning model.

Certain embodiments provide a ML-based solution with a signaling framework to enable the UE DL TX beam prediction.

Various assistance information for downlink transmission beam prediction at the user equipment can be provided to the user equipment. A downlink transmission beam angle index map can be provided to the user equipment. A DL TX angle set for beam pointing angles can be defined, and the angle map can be known to both NW and UE. The angle set can include the following parameters: coverage area in elevation domain $[\theta_1, \theta_2]$, where $\theta_1 \leq \theta_2$; coverage area in azimuth domain $[\phi_1, \phi_2]$, where $\phi_1 \leq \phi_2$; total quantization steps in elevation domain M; total quantization steps in azimuth domain N; or any combination thereof. The total quantization interval in elevation domain can be $\Delta_{ele}=(\theta_2-\theta_1)/M$, and the elevation index sequence can be [0,1,2, . . . , M−1, M]. The quantization interval in azimuth domain can be $\Delta_{ele}=(\phi_2-\phi_1)/N$, and the azimuth index sequence [0, 1, 2, . . . , N−1, N].

Figure 2:
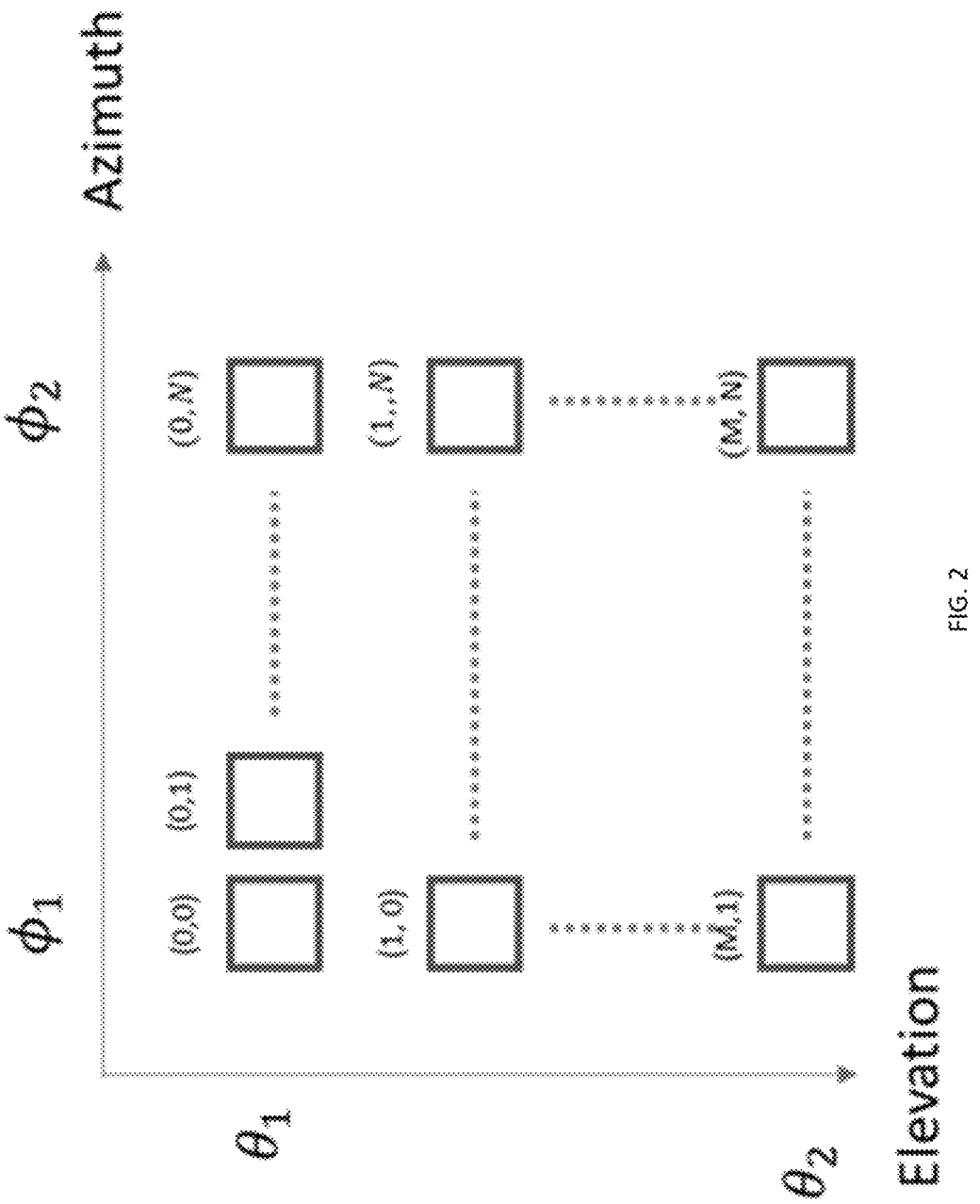
FIG. 2 illustrates a downlink transmission angle set.

FIG. 2 illustrates a downlink transmission angle set. The DL TX angle can be defined as the set $\mathcal{A}$ $(\theta_m, \phi_n)$ and the elements of the set can be constructed with index set $\mathcal{I}=\{(m, n)\}_{\{n \in [0,N], m \in [0,M]\}}$ and a mapping $\mathcal{M}$: $(m, n) \rightarrow (\theta_m, \phi_n)$. One example of a mapping function is $\mathcal{M}(m, n)=(\theta_m, \phi_n)=(\theta_1+m^*\Delta_{ele}, \phi_1+n^*\Delta_{az})$. Thus, the DL TX angle set can be visualized in 2D-azimuth-elevation dimension in FIG. 2.

NW antenna configuration identification can be variously implemented. In order to enable the UE to train a ML model for DL TX beam prediction, in addition to the DL TX angle index map, UE may also benefit from knowing the NW antenna configuration $(M,N,d_{az},d_{ele})$. It has been verified through simulation that a model trained with data generated from one antenna setting $(M_1, N_1, d_{az,1}, d_{ele,1})$ may not perform well if the model is tested with data from another antenna setting $(M_2, N_2, d_{az,2}, d_{ele,2})$ $(M_2, N_2, d_{az,2}, d_{ele,2})$ $\neq(M_1, N_1, d_{az,1}, d_{ele,1})$. This effect may be due to different antenna settings resulting in different pattern shapes/beamwidths for the same beam direction.

Considering that the number of different NW vendors is rather limited, in a certain area the neighbor cells may be implemented by the same NW vendor. Thus, it may be reasonable to assume that in a relatively large area or a relatively long time period, the UE may be served with the same NW antenna configuration $(M,N,d_{az},d_{ele})$. With a rather limited number of different antenna configurations $(M,N,d_{az},d_{ele})$ serving the UE, it may be reasonable for the UE to have different trained models for different NW antenna configurations.

For a UE that has DL TX beam prediction capability, the NW may transmit a message to the UE containing the information needed for identifying the antenna configuration. The information can include any information needed to specify a multi-panel configuration at the gNB, if necessary. The message can also include any other information needed for enabling the beam prediction model selection.

There may be various ways to train an ML model and to perform inference at the UE side for DL TX beam prediction. The NW may provide an antenna configuration identification message to the UE, and the UE may select a suitable model based on that message. There may be additional aspects that may be beneficial for the UE to train a model for DL TX beam prediction. In one aspect, the trained model may be configured to perform accurate DL TX beam prediction for any number of beams in a first set, and each beam in the first set can point to any direction within the serving area. According to another aspect, the trained model can perform accurate DL TX beam prediction for any number of beams in a second set, and each beam in the second set can point to any direction within the serving area.

To address these aspects, certain embodiments can use an NN model that is trained with data from a beam grid of a third set, and the third set can be constructed as described below. The third set can be denoted set C.

Given a DL TX angle set $\mathcal{A}$ $(\theta_m, \phi_n)$ and NW antenna configuration $(M,N, d_{az}, d_{ele})$, the third beam grid set can be constructed as $\{V(\theta_m, \phi_n)\}_{\{(\theta_m,\phi_n) \in \mathcal{A}\}}$ and $$V(\theta_m,\phi_n)=v(\theta_m,\phi_n) \otimes x(\theta_m)$$

$$x(\theta_m) = \frac{1}{\sqrt{M}}\left[1, e^{\frac{j2\pi f_c d_{ele} \sin\theta_m}{c}}, \dots, e^{\frac{j2\pi f_c d_{ele} \sin\theta_m (M-1)}{c}}\right]^T$$

$$v(\theta_m, \phi_n) = \frac{1}{\sqrt{N}}\left[1, e^{\frac{j2\pi f_c d_{az} \sin\phi_n \cos\theta_m}{c}}, \dots, e^{\frac{j2\pi f_c d_{az} \sin\phi_n \cos\theta_m (N-1)}{c}}\right]^T$$

Figure 3:
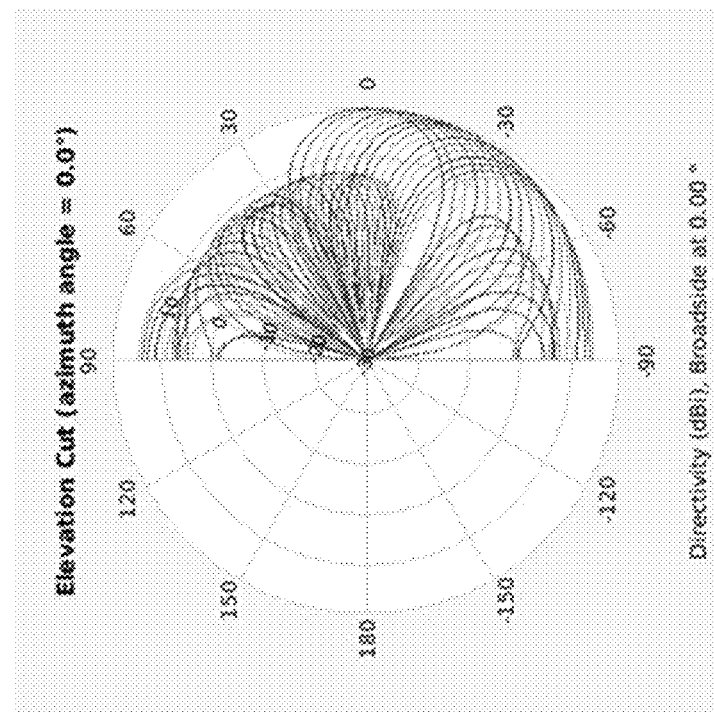
FIG. 3 illustrates azimuth cut and elevation cut for a beam grid.
Figure 3:
Figure 3:
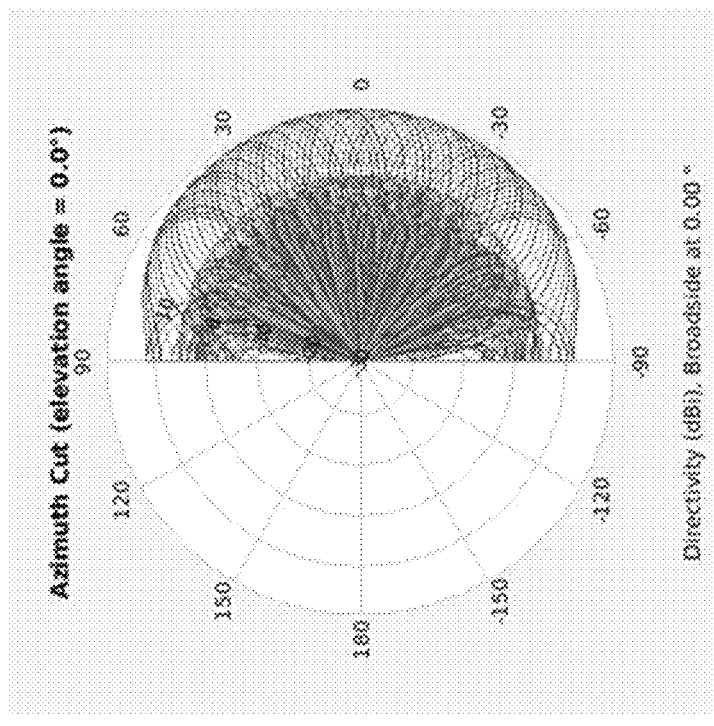

FIG. 3 illustrates azimuth cut and elevation cut for a beam grid. The beam grid shown in FIG. 3 may be used for the third set, which can also be referred to as set C. More specifically, the corresponding beam grid can be visualized in FIG. 3 for the case where the following is set:

$$(M, N, d_{az}, d_{ele}) = \left(4, 8, \frac{\lambda}{2}, \frac{\lambda}{2}\right), [\theta_1, \theta_2] = [-56°, 0°],$$

$$[\phi_1, \phi_2] = [-60°, 60°], \Delta_{ele} = 3.3° \text{ and } \Delta_{az} = 1.875°.$$

By creating a dense enough beam grid for a third set, the targets can be the following. For a given NW, the pointing angles of the beams in a first set may be highly likely to be a subset of the pointing angles of the beams in the third set. For a given NW, for any pointing angle of the beams in the first set that is not an element in third set, one can find another pointing angle in third set that is close to it and has a similar corresponding RSRP.

By constructing a third beam grid set that satisfies the above targets, one can train a model based on third set, with the following procedures. First, a random number, D, of beams can be selected. Then, D random pointing angles can be selected from the third set. The RSRPs of the beams with the selected pointing angles can be used as the input for the beam prediction model. The beam prediction model can then predict the best beam probability for each beam in third set. For convenience, the third set can be denoted as set C.

Figure 4:
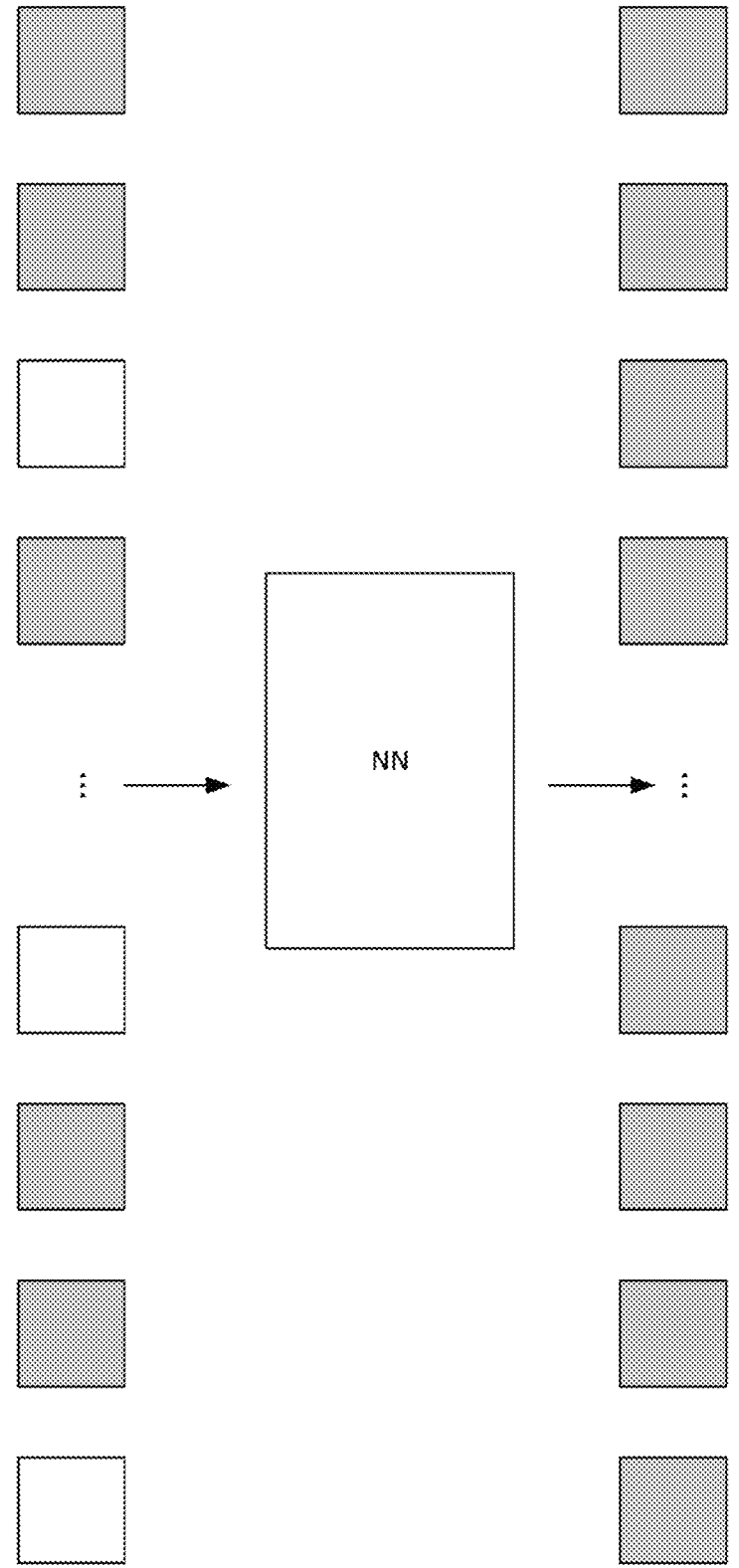
FIG. 4 illustrates an example of model training, according to certain embodiments.

FIG. 4 illustrates an example of model training, according to certain embodiments. In FIG. 4, the grey boxes represent the beams in third set. The grey boxes can be position sensitive: the position of a grey box can uniquely map to one beam in third set. The white boxes among the grey boxes can represent the randomly selected beams for training. The model can try to output the best beam probability for all grey boxes.

Once the model is trained, the inference procedure can be given the RSRPs for all the beams in a second set, if a beam #i in the second set is an element in the third set, then the RSRP for beam #i can be in the grey box with position that has the same beam pointing angle as beam #i. If beam #i in the second set is not an element in the third set, then the RSRP for beam #i can be put in the grey box with position that has the closest beam pointing angle to beam #i.

With this input, the model can then predict the best beam probability for all beams in third set. If beam #j in the first set is an element in third set, then the prediction result for the grey box with position that has the same beam pointing angles as beam #j can be the prediction result for beam #j. If beam #j in the first set is not an element in the third set, then the prediction result for the grey box with position that has the closest beam pointing angles to beam #j can be the prediction result for beam #j.

Figure 5:
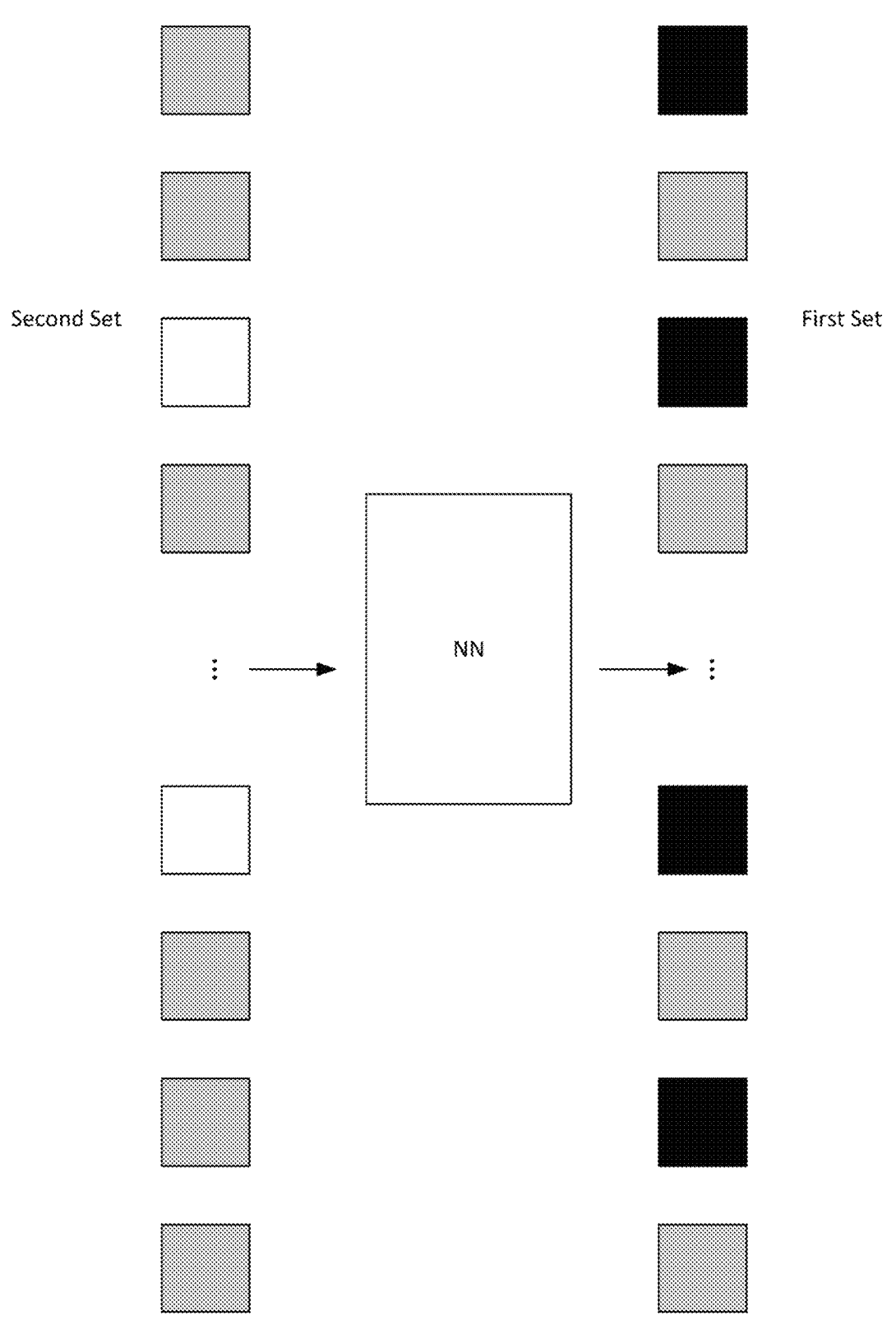
FIG. 5 illustrates the machine learning model detail and training detail, according to certain embodiments.

FIG. 5 illustrates the machine learning model detail and training detail, according to certain embodiments. In FIG. 5, the white boxes amongst the grey boxes represent the beams in the second set or the closest beams to the beams in the second set, and the black boxes amongst the grew boxes represent the beams in the first set or the closest beams to the beams in the first set. In FIG. 5, the model inference for the UE DL TX beam prediction is illustrated, in which the second set is a subset of the first set.

Reference signal resource configuration can be enhanced in various ways. For example, the NW can indicate to the UE the beam indexes or one or more angle identifiers information for the DL TX beams by configuring the RS resource as follows. One or multiple angle IDs can be configured in one NZP-CSI-RS-Resource. For each angle ID, the configuration could be an index pair (m,n). Each angle ID can uniquely map to the DL TX angle set by $\mathcal{M}(m, n)=(\theta_m, \phi_n)=(\theta_1+m^*\Delta_{ele}, \phi_1+n^*\Delta_{az})$. If one angle ID (m,n) is configured, the UE can expect that the CSI-RS resource will be transmitted through a DL TX beam with boresight direction points to $(\theta_m, \phi_n)$. If multiple different angle IDs $\{(m_1, n_1), (m_2, n_2), \ldots, (m_k, n_k)\}$ are configured, each angle ID can map to a DL TX beam angle pair $(\theta_k, \phi_k)$. The UE can expect the CSI-RS resource to be transmitted through a DL TX beam with boresight direction that covers the angles $\{(\theta_1, \phi_1), (\theta_1, \phi_2), \ldots, (\theta_k, \phi_{nk})\}$ One example of mapping the beamwidth to multiple cover angles $\{(\theta_1, \phi_1), (\theta_1, \phi_2), \ldots, (\theta_k, \phi_{nk})\}$ is beam elevation 3 dB beamwidth is $$\max\left\{\max_{\forall k}\theta_k - \min_{\forall k}\theta_k, \Delta_{ele}\right\}$$

and beam azimuth 3 dB beamwidth is $$\max\left\{\max_{\forall k}\phi_k - \min_{\forall k}\phi_k, \Delta_{az}\right\}.$$

A CSI report can be enhanced. The NW can configure the UE with one RS resource set for prediction, and one or more RS resource set(s) for measurements. The prediction resource set and the measurement resource set(s) can be associated. If both the prediction resource set and the measurement resource set(s) are configured, and if the DL TX beam prediction model training and inference are at the UE side, the UE can expect each resource in the prediction resource set and measurement resource set(s) to be configured with one or more angle IDs.

The UE can measure the CSI, for example L1-RSRP, for the resources in the measurement resource set(s), and the UE can apply the measurements as input for the beam prediction model to predict the probability of the best DL TX beam, and/or the corresponding beam RSRP, for the resources in the prediction resource set.

If only measurement resource set(s) are configured, the UE may expect each resource in the measurement resource set(s) to be configured with one or more angle IDs. The UE can measure the CSI, for example L1-RSRP, for the resources in the measurement resource set(s), and the UE can apply the measurements as input for the beam prediction model to predict the possible best DL TX beam angles, and/or the corresponding beam RSRP. The NW may configure the UE to report one or more predicted angle IDs for the predicted DL TX beam angles. Moreover, the NW may construct one or more DL TX beams based on the reported angle IDs.

Figure 6:
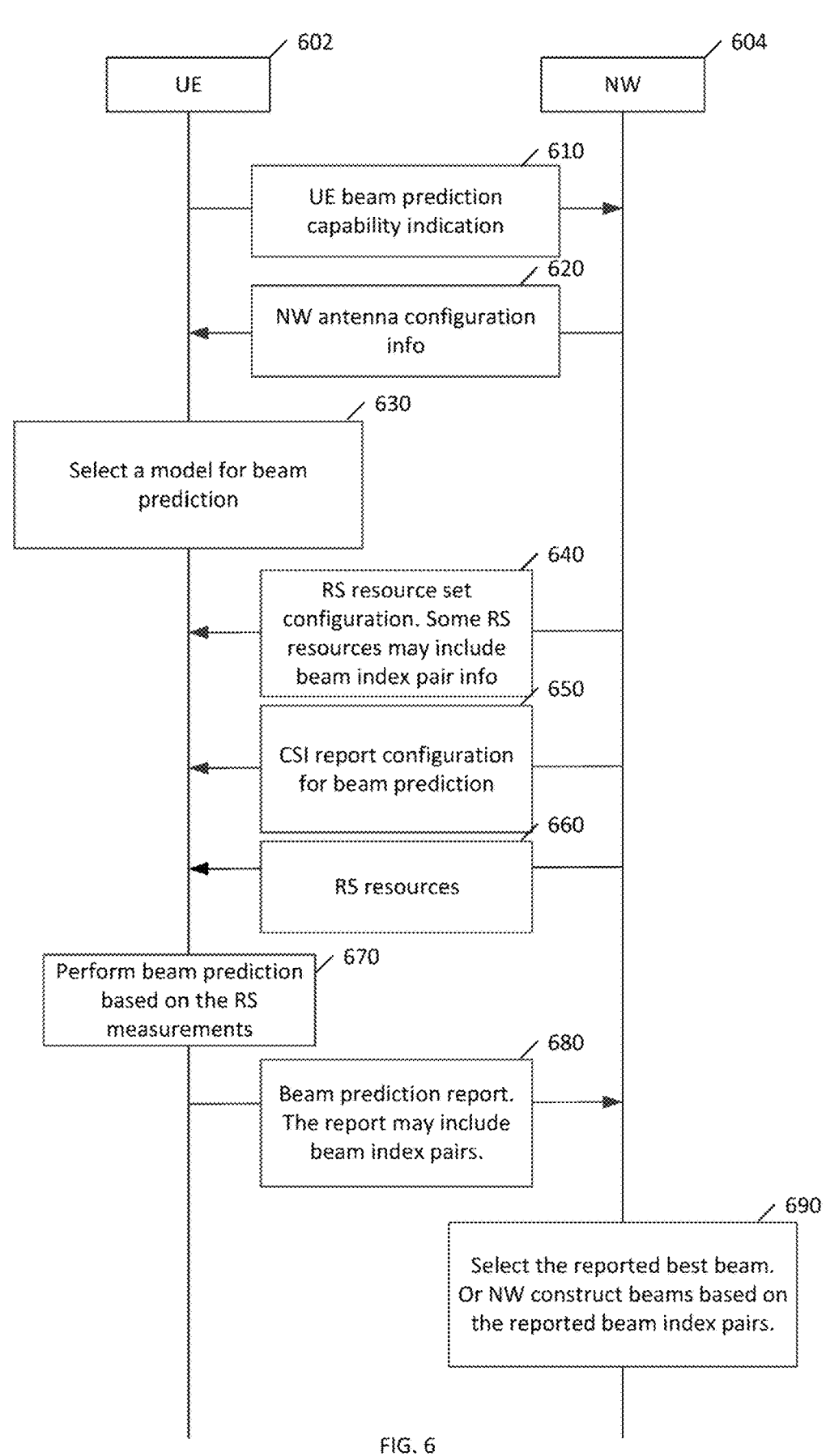
FIG. 6 illustrates a signaling procedure that may permit a user equipment to perform downlink transmission beam prediction, according to certain embodiments.

FIG. 6 illustrates a signaling procedure that may permit a user equipment to perform downlink transmission beam prediction, according to certain embodiments. The signaling procedure in FIG. 6 can be summarized by the following non-exhaustive description.

At 610, UE 602 can indicate to NW 604 the DL TX beam prediction capability of UE 602. NW 604 may be a gNB or the like. At 620, NW 602 may transmit a NW antenna configuration ID to UE 604. At 630, based on the NW antenna configuration ID, UE 602 can select a beam prediction model. As mentioned above, UE 602 may have multiple beam prediction models to select from, each of which may have been previously trained.

At 640, NW 604 can configure UE 602 with RS resource set(s) for measurement and, as an optional configuration, NW 604 may configure UE 602 with RS resource set for prediction. The RS resource set may include beam index pair information. The terms "beam indexes," "angle identifiers," and "beam index pairs," can refer to the same thing and can be interchangeable based on pre-configured rules.

NW may further configure UE with CSI report for beam prediction at 650. If prediction resource set is configured for CSI report, UE expect each resource in the prediction resource set and measurement resource set(s) to be configured with one or more angle IDs. If no prediction resource set is configured but the CSI report is configured with reporting one or more beam angle IDs, the UE may expect each resource in the measurement resource set(s) to be configured with one or more angle IDs.

At 660 NW 602 can send RS resources and UE 604 can measure the CSI for the resources in the measurement resource set(s) and/or prediction resource set(s). If CSI report for beam prediction is configured, UE 602 may apply the measured CSI to the prediction model and get the beam prediction results 670. The prediction results may include one or more CRIs for the RS resources for the prediction resource set(s) as the predicted best beams; one or more CRIs and the corresponding predicted RSRP for the RS resources in the prediction resource set(s) as the predicted best beams; and/or one or more beam angle IDs if prediction resource set is not configured. The beam prediction report may be sent from UE 602 to NW 604 at 680. Based on the prediction report, at 690 NW 604 may select the reported best predicted beam, which may be the beam with the highest predicted ranking or highest predicted RSRP. If angle ID is reported, the NW may construct one or more DL TX beams based on the reported beam angle IDs.

While FIGS. 4 and 5 illustrate a general approach to NN model training and interference, the following provides some detail and example of NN model design and training.

FIG. 7A illustrates a neural network model layout for user equipment downlink transmission beam prediction, according to certain embodiments, in a tabular form. The NN can be implemented with dense layer and residual connection, with the table in FIG. 7A providing an example of dense neural network (DNN) structure. In FIG. 7A, |Set C| can be the total number of beams in Set C and K can be a positive integer larger than or equal to 1. Set C can be the third set, as described above. Set C can be a different set of beams from either set A or set B. Set C can be a completely non-overlapping set, an overlapping set, a superset, or a subset of sets A and B.

Figure 7B:
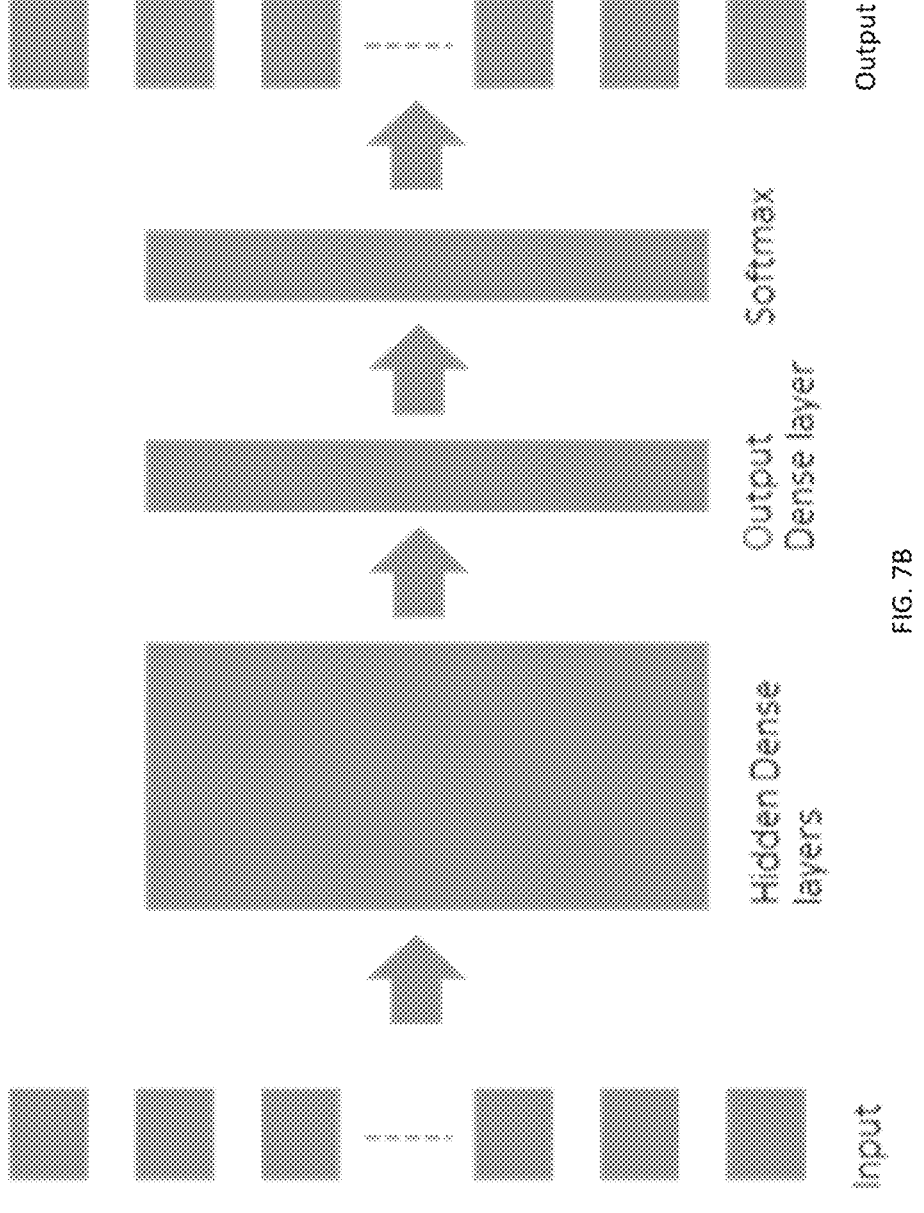
FIG. 7B illustrates a dense neural network visualization, according to certain embodiments.

FIG. 7B illustrates a dense neural network visualization, according to certain embodiments. As shown in FIG. 7B, from left to right, the neural network can start from an input and provide an output. The input may be provided to hidden dense layers, which may feed an output dense layer. The output dense layer may feed a softmax layer, which may provide the output. The inputs and outputs are described above with reference to FIGS. 4 and 5, by way of example.

The input vector can be expressed as $x_{input} = \Sigma_{\{i \in set\ C\}} h_i$, where $h_i$ is one-hop embedding vector with size |Set C|×1—the i-th element in $h_i$ has the RSRP for the i-th beam in Set C, other elements in $h_i$ are zeros. All the hidden layers including the residual connection can be expressed as $x_{hidden} = \sigma(W_J \sigma( \ldots \sigma(W_1 x_{input} + b_1)) + W_J \sigma( \ldots \sigma(W_1 x_{input} + b_1)) + b_J)$, where I≠J≥1. The output vector can be expressed as $y_{output} = \text{softmax}(W_{out} x_{hidden} + b_{out})$.

FIG. 7C illustrates a pseudocode example of a training algorithm for a neural network according to certain embodiments. More particularly, the training algorithm of FIG. 7C may be suitable for training the DNN model illustrated in FIGS. 7A and 7B.

As shown in FIG. 7C, the training approach can begin by initializing values of layer weights for all NN layers, a learning rate of the NN, and a sequence. As long as a stopping criterion is not met, multiple elements can be selected to form the sequence. For each element, beams can randomly selected. RSRPs input vector can be constructed. Once a minibatch of training data is constructed, the minibatch can be used as an input for the model, and the corresponding output can be collected. Weights can be updated. The learning rate can also be updated. The model coefficients can be saved. Subsequently, from saved models, a model can be picked based on the model having the best beam prediction accuracy or minimum RSRP prediction error with the test data set.

A graph neural network (GNN) can be viewed as a further refinement to a DNN that may be applicable to certain embodiments. From the output vector in DNN $y_{output}$, each element can be expressed as $y_{output,\ i} = \text{softmax}(w_{out,i} x_{hidden} + b_{out,\ i})$, where $w_{out,i}$ is the i-th row of $W_{out}$ and $b_{out,\ i}$ is the i-th element in $b_{out}$. With $y_{output,\ i}$ and the expression of $x_{hidden}$, the DNN can be understood in the following way. Each beam can be considered the vertex of a graph. The adjacency matrix of this graph can be a matrix that has 1 in all entries. One-hop embedding can be processed as node embedding for all nodes. Message passing and message aggregation can be processed for each node with the first-order neighborhood. In a fully connected graph, the first-order neighborhood is essential all the other nodes.

Figure 8:
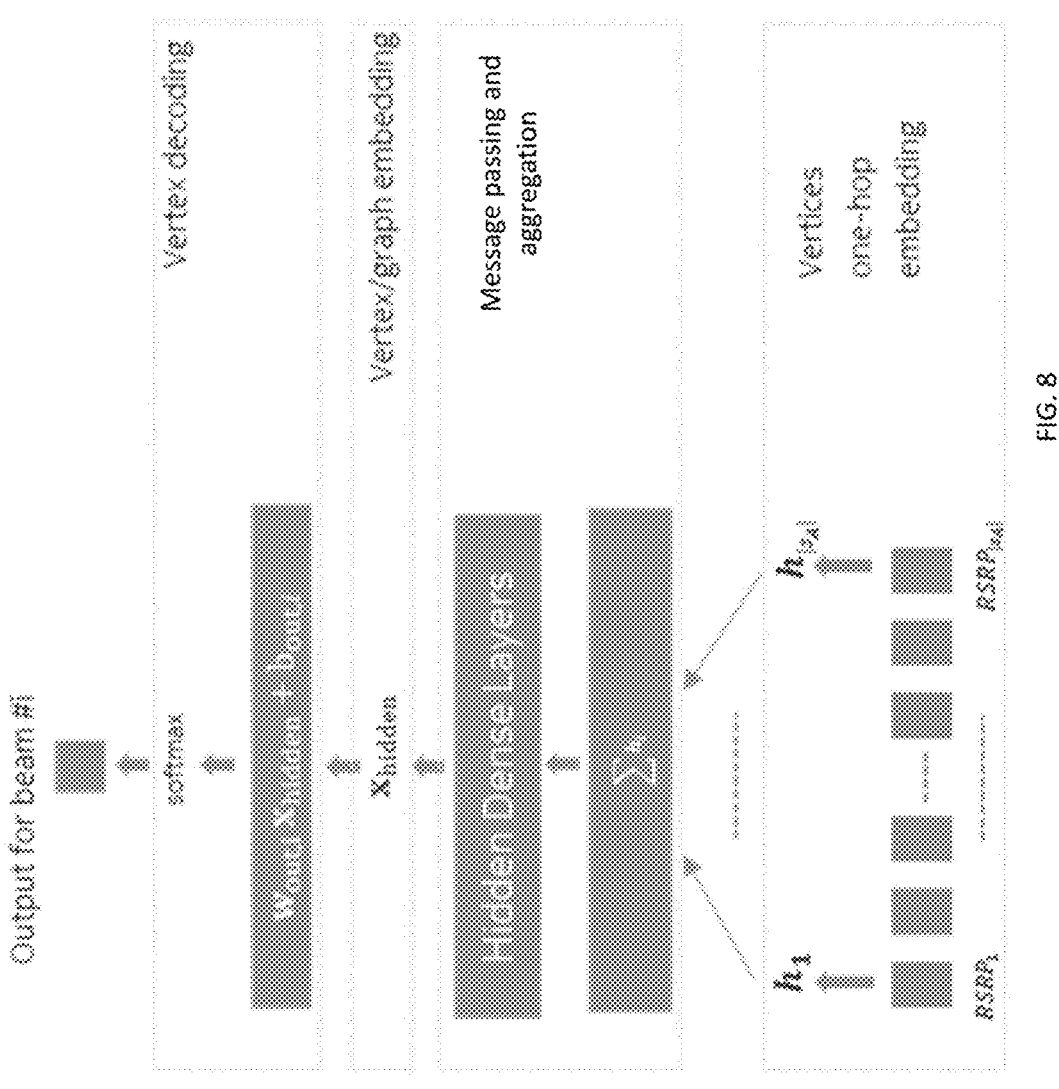
FIG. 8 illustrates a computational graph for a given node or beam, according to certain embodiments.

FIG. 8 illustrates a computational graph for a given node or beam, according to certain embodiments. From FIG. 8, it can be seen that in the DNN, the message passing and aggregation from the first order neighborhood can be the same for all the nodes, because the assumption can be that the beam grid is a fully connected graph in the DNN, and therefore the embedding $x_{hidden}$ can be the same for all the nodes. To differentiate different nodes, each node can have a different decoder function $w_{out,i} x_{hidden} + b_{out,\ i}$.

By interpreting the DNN as a GNN, the expressive power of the computational graph for each node may be increased, so that during the random beam training process (see FIG. 7C), the embedding for each node can be different. Then the ML model can learn the relationship between the node specific embedding and the best beam probability.

Figure 9:
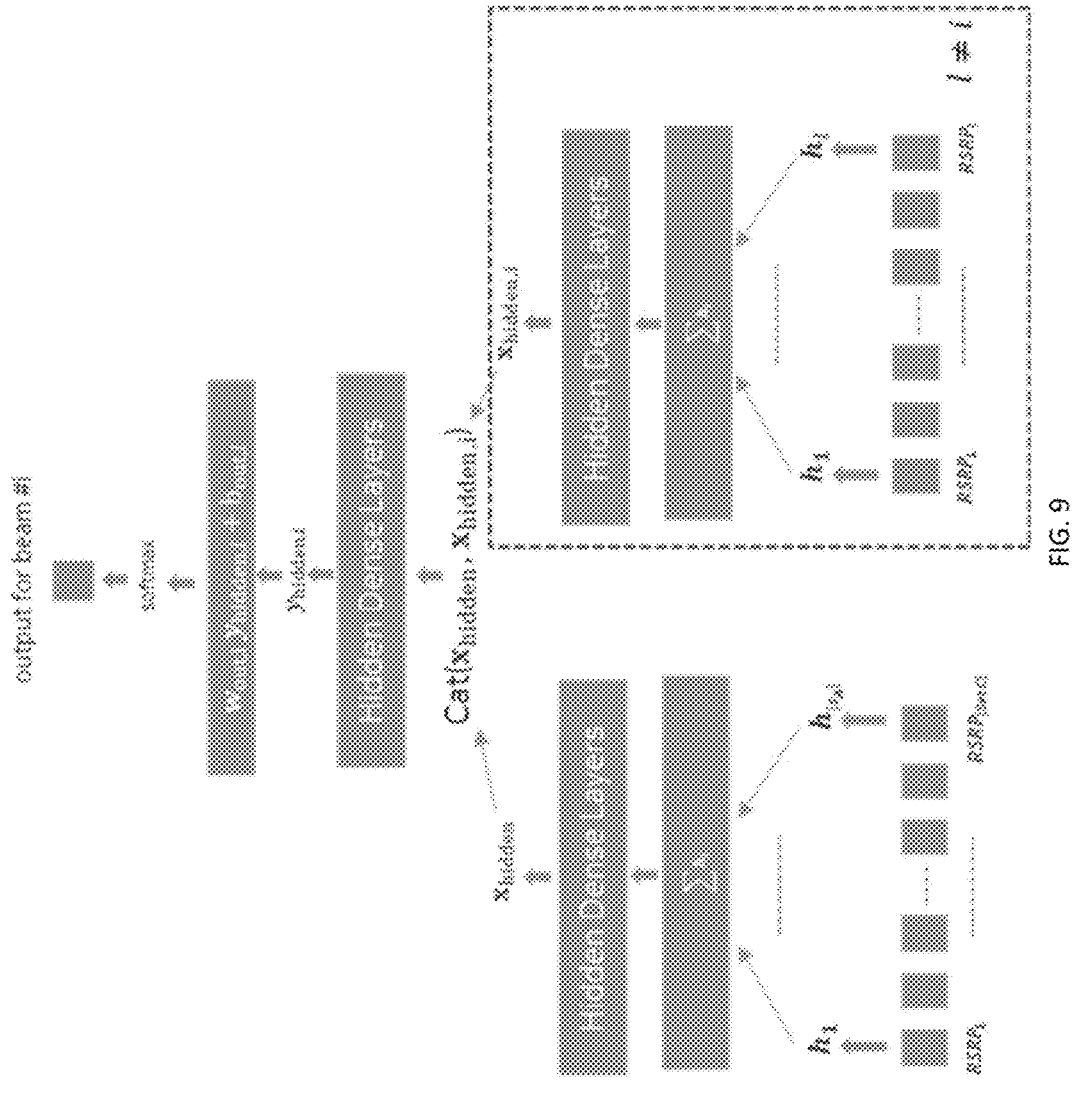
FIG. 9 illustrates a computational graph for a given node or beam with neighborhood embedding, according to certain embodiments.

FIG. 9 illustrates a computational graph for a given node or beam with neighborhood embedding, according to certain embodiments. To increase the expressive power of the computational graph, various techniques can be used. For example, as shown in FIG. 9, node-specific neighborhood embedding can be incorporated into the computational graph as it is shown in FIG. 9. The dashed box can be the node #i first order embedding, by excluding the node #i RSRP, and the node-specific neighborhood embedding can be unique to different nodes. Adding the extra node neighborhood embedding idea can also be implemented with convolutional neural network (CNN) as CNN is a special case of GNN.

FIG. 10A illustrates a computational graph for a given node or beam with second-order neighborhood embedding, according to certain embodiments. As shown in FIG. 10A, the node-specific neighborhood embedding can be added as a second-order neighborhood in the computational graph. In FIG. 10A, node #i second-order neighborhood embedding into the computational graph is shown in a dashed box. Other techniques for increasing the expressive power of the node computational graph are not excluded.

FIG. 10B illustrates a pseudocode example of a training algorithm for a graph neural network according to certain embodiments. As shown in FIG. 10B, the training approach can begin by initializing values of layer weights for all NN layers, a learning rate of the GNN, and a sequence. As long as a stopping criterion is not met, multiple elements can be selected to form the sequence. For each element, beams can randomly selected. RSRPs input vector can be constructed. Once a minibatch of training data is constructed, nodes from the total output nodes can be randomly sampled. The minibatch can be used as an input for the model, and the corresponding output can be collected. Weights can be updated. The learning rate can also be updated. The model coefficients can be saved. Subsequently, from saved models, a model can be picked based on the model having the best beam prediction accuracy or minimum RSRP prediction error with the test data set.

Figure 11:
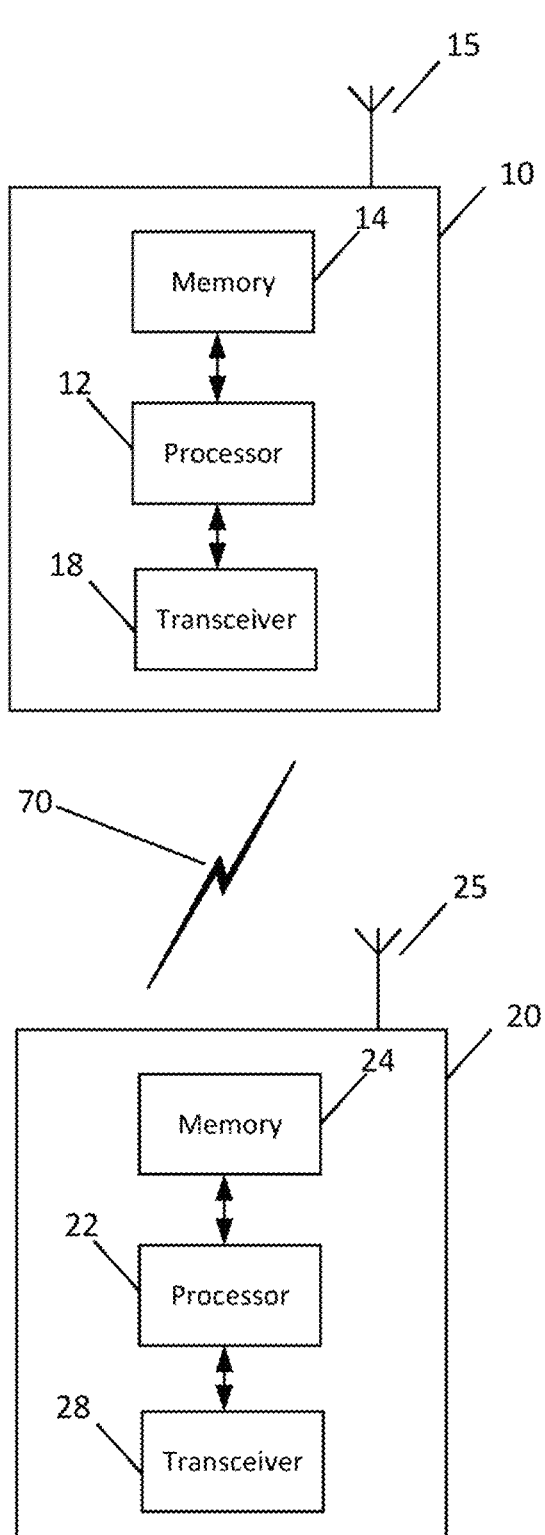
FIG. 11 illustrates an example block diagram of a system, according to an embodiment.

FIG. 11 illustrates an example of a system that includes an apparatus 10, according to an embodiment. In an embodiment, apparatus 10 may be a node, host, or server in a communications network or serving such a network. For example, apparatus 10 may be a network node, satellite, base station, a Node B, an evolved Node B (eNB), 5G Node B or access point, next generation Node B (NG-NB or gNB), TRP, HAPS, integrated access and backhaul (IAB) node, and/or a WLAN access point, associated with a radio access network, such as a LTE network, 5G or NR. In some example embodiments, apparatus 10 may be gNB or other similar radio node, for instance.

It should be understood that, in some example embodiments, apparatus 10 may include an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a mid-haul interface, referred to as an F1 interface, and the DU(s) may have one or more radio unit (RU) connected with the DU(s) over a front-haul interface. The DU may be a logical node that includes a subset of the gNB functions, depending on the functional split option. It should be noted that one of ordinary skill in the art would understand that apparatus 10 may include components or features not shown in FIG. 11.

As illustrated in the example of FIG. 11, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, or any other processing means, as examples. While a single processor 12 is shown in FIG. 11, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to a user equipment downlink transmission beam prediction framework with machine learning.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be include any combination of random access memory (RAM), read only memory (ROM), static storage such as a magnetic or optical disk, hard disk drive (HDD), or any other type of non-transitory machine or computer readable media, or other appropriate storing means. The instructions stored in memory 14 may include program instructions or computer program code that, when executed by processor 12, enable the apparatus 10 to perform tasks as described herein. The term "non-transitory," as used herein, may correspond to a limitation of the medium itself (i.e., tangible, not a signal) as opposed to a limitation on data storage persistency (e.g., RAM vs. ROM).

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15, or may include any other appropriate transceiving means. The radio interfaces may correspond to a plurality of radio access technologies including one or more of global system for mobile communications (GSM), narrow band Internet of Things (NB-IoT), LTE, 5G, WLAN, Bluetooth (BT), Bluetooth Low Energy (BT-LE), near-field communication (NFC), radio frequency identifier (RFID), ultra-wideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (via an uplink, for example).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device), or an input/output means.

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry/means or control circuitry/means. In addition, in some embodiments, transceiver 18 may be included in or may form a part of transceiver circuitry/means.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be or may be a part of a network element or RAN node, such as a base station, access point, Node B, eNB, gNB, TRP, HAPS, IAB node, relay node, WLAN access point, satellite, or the like. In one example embodiment, apparatus 10 may be a gNB or other radio node, or may be a CU and/or DU of a gNB. According to certain embodiments, apparatus 10 may be controlled by memory 14 and processor 12 to perform the functions associated with any of the embodiments described herein. For example, in some embodiments, apparatus 10 may be configured to perform one or more of the processes depicted in any of the flow charts or signaling diagrams described herein, such as those illustrated in FIGS. 1-10B, or any other method described herein. In some embodiments, as discussed herein, apparatus 10 may be configured to perform a procedure relating to providing a user equipment downlink transmission beam prediction framework with machine learning, for example.

FIG. 11 further illustrates an example of an apparatus 20, according to an embodiment. In an embodiment, apparatus 20 may be a node or element in a communications network or associated with such a network, such as a UE, communication node, mobile equipment (ME), mobile station, mobile device, stationary device, IoT device, or other device. As described herein, a UE may alternatively be referred to as, for example, a mobile station, mobile equipment, mobile unit, mobile device, user device, subscriber station, wireless terminal, tablet, smart phone, IoT device, sensor or NB-IoT device, a watch or other wearable, a head-mounted display (HMD), a vehicle, a drone, a medical device and applications thereof (e.g., remote surgery), an industrial device and applications thereof (e.g., a robot and/or other wireless devices operating in an industrial and/or an automated processing chain context), a consumer electronics device, a device operating on commercial and/or industrial wireless networks, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 11.

As illustrated in the example of FIG. 11, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 11, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can include any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDM symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 20 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and memory 24 may be included in or may form a part of processing circuitry or control circuitry. In addition, in some embodiments, transceiver 28 may be included in or may form a part of transceiving circuitry.

As discussed above, according to some embodiments, apparatus 20 may be a UE, SL UE, relay UE, mobile device, mobile station, ME, IoT device and/or NB-IoT device, or the like, for example. According to certain embodiments, apparatus 20 may be controlled by memory 24 and processor 22 to perform the functions associated with any of the embodiments described herein, such as one or more of the operations illustrated in, or described with respect to, FIGS. 1-10B, or any other method described herein. For example, in an embodiment, apparatus 20 may be controlled to perform a process relating to providing a user equipment downlink transmission beam prediction framework with machine learning, as described in detail elsewhere herein.

In some embodiments, an apparatus (e.g., apparatus 10 and/or apparatus 20) may include means for performing a method, a process, or any of the variants discussed herein. Examples of the means may include one or more processors, memory, controllers, transmitters, receivers, and/or computer program code for causing the performance of any of the operations discussed herein.

In view of the foregoing, certain example embodiments provide several technological improvements, enhancements, and/or advantages over existing technological processes and constitute an improvement at least to the technological field of wireless network control and/or management. Certain embodiments may have various benefits and advantages. For example, in certain embodiments user equipment downlink transmission beam prediction can be enhanced in a way that may readily extended with reception beam prediction. For example, certain embodiments can avoid the need for prediction being based on a model provided without further insight from the network. Thus, certain embodiments may enhance communications including services that rely on beam-forming in wireless communication.

In some example embodiments, the functionality of any of the methods, processes, signaling diagrams, algorithms or flow charts described herein may be implemented by software and/or computer program code or portions of code stored in memory or other computer readable or tangible media, and may be executed by a processor.

In some example embodiments, an apparatus may include or be associated with at least one software application, module, unit or entity configured as arithmetic operation(s), or as a program or portions of programs (including an added or updated software routine), which may be executed by at least one operation processor or controller. Programs, also called program products or computer programs, including software routines, applets and macros, may be stored in any apparatus-readable data storage medium and may include program instructions to perform particular tasks. A computer program product may include one or more computer-executable components which, when the program is run, are configured to carry out some example embodiments. The one or more computer-executable components may be at least one software code or portions of code. Modifications and configurations required for implementing the functionality of an example embodiment may be performed as routine(s), which may be implemented as added or updated software routine(s). In one example, software routine(s) may be downloaded into the apparatus.

As an example, software or computer program code or portions of code may be in source code form, object code form, or in some intermediate form, and may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality of example embodiments may be performed by hardware or circuitry included in an apparatus, for example through the use of an application specific integrated circuit (ASIC), a programmable gate array (PGA), a field programmable gate array (FPGA), or any other combination of hardware and software. In yet another example embodiment, the functionality of example embodiments may be implemented as a signal, such as a non-tangible means, that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

Example embodiments described herein may apply to both singular and plural implementations, regardless of whether singular or plural language is used in connection with describing certain embodiments. For example, an embodiment that describes operations of a single network node may also apply to example embodiments that include multiple instances of the network node, and vice versa.

One having ordinary skill in the art will readily understand that the example embodiments as discussed above may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

Partial Glossary

2D Two Dimensional
3D Three Dimensional
3GPP Third Generation Partnership Project
5G 5th Generation
AI Artificial Intelligence
CNN Convolutional Neural Network
CSI Channel State Information
DL Downlink
DNN Deep Neural Networks
FFN Feed-Forward Networks
FR-1 Frequency Range 1
FR-2 Frequency Range 2
gNB Next generation NodeB
GNSS Global Navigation Satellite System
GoB Grid of Beams
GPS Global Positioning System
LMF Location Management Function
ML Machine Learning
mmWave millimeter Wave
NR New Radio
P1 Procedure 1
P2 Procedure 2

P3 Procedure 3
RAN Radio Access Network
RS Reference Signal
RSRP Reference Signal Received Power
RTT Round Trip Time
Rx Receiver
SA Standalone
SSB Synchronization Signal Block
TDOA Time Difference of Arrival
Tx Transmitter
UE User Equipment
UL Uplink

We claim:

1. An apparatus, comprising:
at least one processor; and
at least one memory storing instructions that, when executed by the at least one processor, cause the apparatus at least to perform
indicating a beam prediction capability of the apparatus to a network;
receiving network antenna configuration identification responsive to the indicated beam prediction capability;
selecting a model for beam prediction based on the network antenna configuration identification;
receiving a configuration of reference signal resources;
measuring reference signals based on the configuration of reference signal resources;
performing beam prediction based on the measured references signals using the selected model; and
reporting a beam prediction to the network.

2. The apparatus of claim 1, wherein the configuration of at least some of the reference signal resources comprise beam indexes or one or more angle identifiers information.

3. The apparatus of claim 1, wherein the report comprises beam indexes or one or more angle identifiers.

4. The apparatus of claim 1, wherein the instructions, when executed by the at least one processor, further cause the apparatus at least to perform
receiving a channel state information configuration for beam prediction, wherein the reference signals are measured in accordance with the channel state information configuration.

5. The apparatus of claim 1, wherein the model is trained on a set of data comprising different beams from the measured references signals and different beams from the beam prediction.

6. The apparatus of claim 1, wherein the network antenna configuration comprises numbers of rows and columns of antenna elements in a two-dimensional planar antenna, and antenna element distance in azimuth and elevation domain, respectively, of the antenna elements.

7. The apparatus of claim 1, wherein the model comprises a machine learning model trained at the apparatus.

8. The apparatus of claim 1, wherein the instructions, when executed by the at least one processor, further cause the apparatus at least to perform
when both a prediction resource set and a measurement resource set are configured to the apparatus, identifying resources in the prediction resource set and measurement resource set with beam indexes or one or more angle identifiers, wherein the performing beam prediction based on the beam indexes or one or more angle identifiers.

9. The apparatus of claim 1, wherein the configuration of reference signal resources comprises a measurement resource set or a prediction resource set and the measurement resource set.

10. The apparatus of claim 1, wherein beam prediction reported to the network comprises at least one of a channel state information reference signal resource indicator for a reference signal resource in a prediction resource set as a predicted best beam; at least one channel state information reference signal resource indicator and a corresponding predicted reference signal received power for a reference signal resource in a prediction resource set as a predicted best beam; or one or more beam indexes or beam angle identifiers.

11. An apparatus, comprising:
at least one processor; and
at least one memory storing instructions that, when executed by the at least one processor, cause the apparatus at least to perform
receiving an indication of a beam prediction capability of the apparatus;
providing, to the apparatus, a network antenna configuration identification responsive to the indicated beam prediction capability;
providing, to the apparatus, a configuration of reference signal resources;
receiving a beam prediction from the apparatus based on the network antenna configuration identification and configuration of reference signal resources.

12. The apparatus of claim 11, wherein the configuration of at least some of the reference signal resources comprise beam indexes or one or more angle identifiers information.

13. The apparatus of claim 11, wherein the report comprises beam indexes or one or more angle identifiers.

14. The apparatus of claim 11, wherein the instructions, when executed by the at least one processor, further cause the apparatus at least to perform
providing, to the apparatus, a channel state information configuration identification for beam prediction, wherein the reference signals are measured in accordance with the channel state information configuration.

15. The apparatus of claim 11, wherein the network antenna configuration comprises downlink transmission beam angle index information.

16. The apparatus of claim 11, wherein the network antenna configuration comprises numbers of rows and columns of antenna elements in a two-dimensional planar antenna, and antenna element distance in azimuth and elevation domain, respectively, of the antenna elements.

17. The apparatus of claim 11, wherein the configuration of reference signal resources comprises a measurement resource set or a prediction resource set and the measurement resource set.

18. The apparatus of claim 11, wherein beam prediction reported by the apparatus comprises at least one of a channel state information reference signal resource indicator for a reference signal resource in a prediction resource set as a predicted best beam; at least one channel state information reference signal resource indicator and a corresponding predicted reference signal received power for a reference signal resource in a prediction resource set as a predicted best beam; or one or more beam indexes or beam angle identifiers.

19. A method, comprising:
indicating a beam prediction capability of an apparatus to a network;
receiving network antenna configuration identification responsive to the indicated beam prediction capability;
selecting a model for beam prediction based on the network antenna configuration identification;
receiving a configuration of reference signal resources;

measuring reference signals based on the configuration of reference signal resources;

performing beam prediction based on the measured references signals using the selected model; and reporting a beam prediction to the network.

20. The method of claim 19, wherein the configuration of at least some of the reference signal resources comprise beam indexes or one or more angle identifiers information.

* * * * *